No. 706,766. Patented Aug. 12, 1902.
I. N. LEWIS.
RANGE FINDER.
(Application filed Oct. 22, 1901.)
(No Model.) 2 Sheets—Sheet 1.
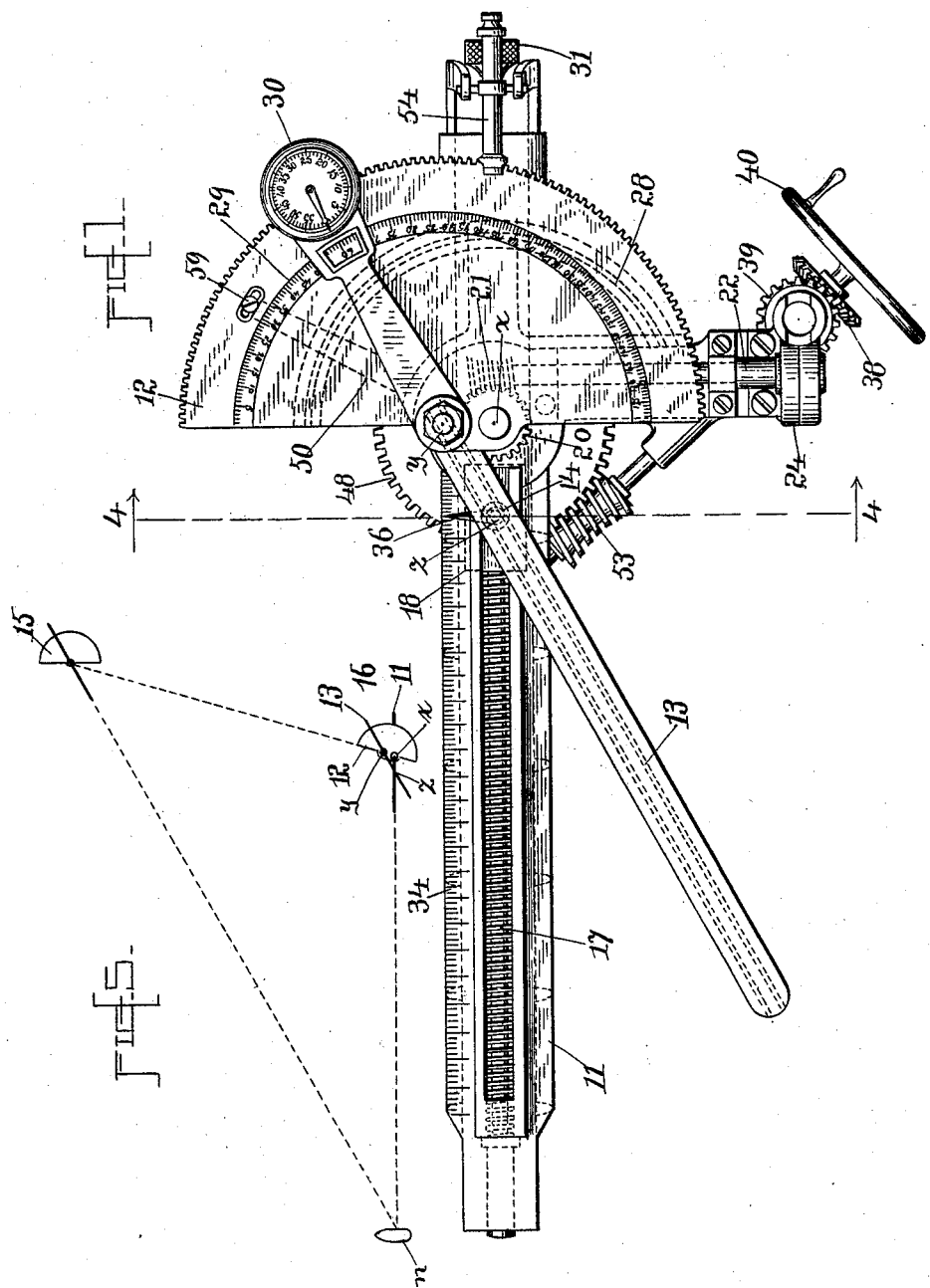

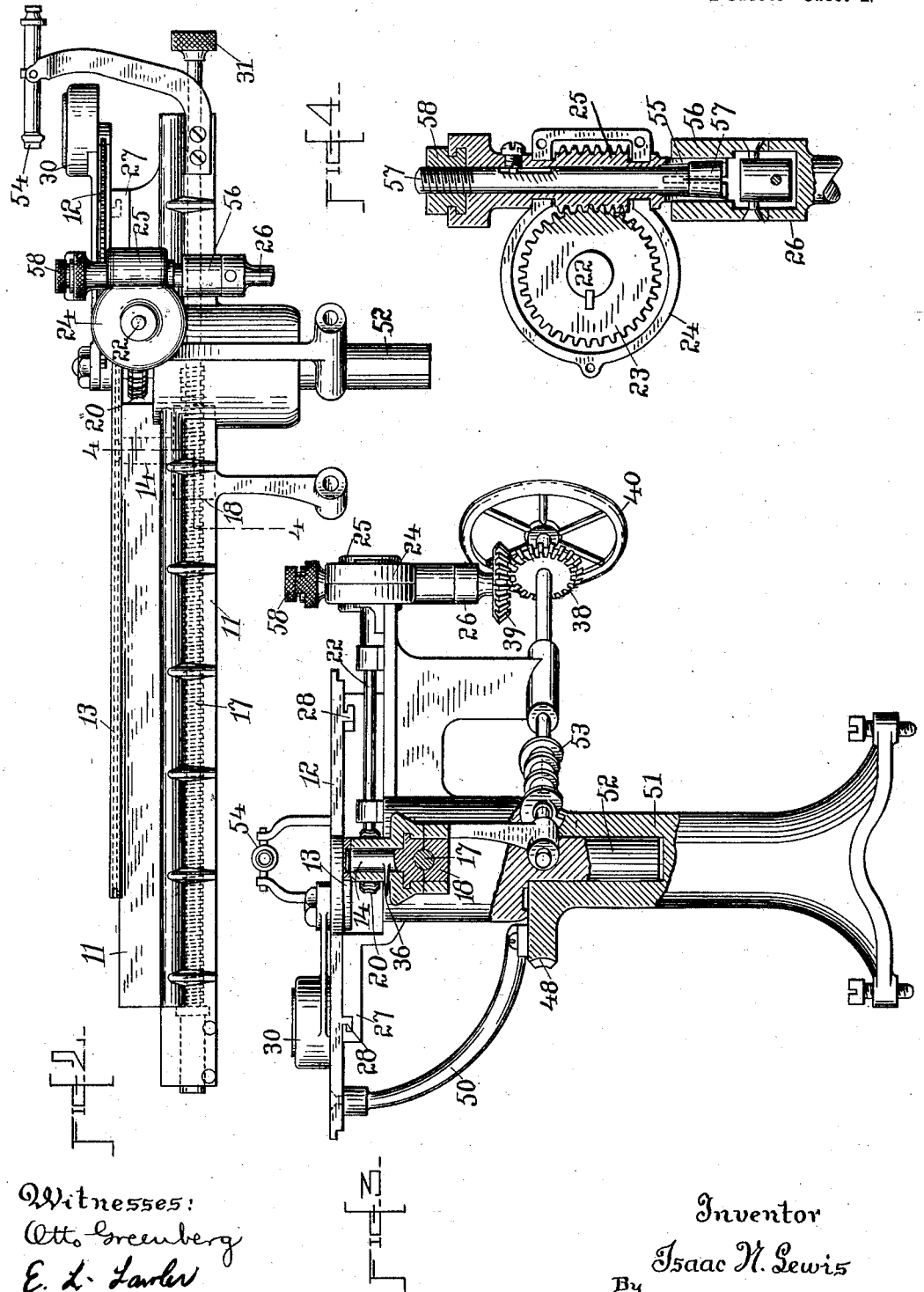

UNITED STATES PATENT OFFICE.

ISAAC N. LEWIS, OF WASHINGTON, DISTRICT OF COLUMBIA.

RANGE-FINDER.

SPECIFICATION forming part of Letters Patent No. 706,766, dated August 12, 1902.

Application filed October 22, 1901. Serial No. 79,524. (No model.)

*To all whom it may concern:*

Be it known that I, ISAAC N. LEWIS, a citizen of the United States, and a resident of Washington, in the District of Columbia, have invented certain new and useful Improvements in Range-Finders, of which the following is a specification.

This invention relates to an improvement in range-finders, and particularly to that class of range-finders employing a horizontal base-line.

One object of the invention is the construction of a horizontal-base range-finder which will serve as the instrument for one terminus of the base-line and which when set according to the direction of the target from said terminus and according to similar data respecting said target sent in from the other terminus will immediately show the range of said target without plotting or computation.

Another object of the invention is to so construct the instrument that the only data needed from the other station is the true azimuth of the target as observed from that station.

Another object of the invention is the construction of an instrument for the purposes above specified in a simple and durable manner and of a size that will render it conveniently portable.

A still further object is to so construct the instrument that it will be well adapted for determining the distance of any remote object whether on land or on water, and thereby be of service as a range-finder and as a surveyor's instrument in triangulation.

With these objects in view the invention consists in the construction, combination, and formation of parts, substantially as hereinafter described and claimed.

The invention will be described with special reference to range-finding for cannon, though, as instanced above, it is not to be thereby limited solely to that use. In practice it is most convenient and effective to locate the range-finder at the gun to which it is to serve, though obviously it may have any suitable location and have its findings transmitted to the gun-station. In disclosing the invention then the gun-station will be treated as the terminus of the base-line at which the range-finder is located.

In the drawings which accompany this specification and form a part thereof, Figure 1 represents in plan the principal elements of my improved range-finder. Fig. 2 is a side elevation thereof. Fig. 3 is a transverse vertical section taken in the plane indicated by lines 4 4, Figs. 1 and 2. Fig. 4 is a vertical central section through a portion of the range-finder, on an enlarged scale, and taken in the plane indicated by the line 5 5, Fig. 3. Fig. 5 is a diagram illustrating the application of the range-finder.

In its general form the apparatus constructed in the preferred manner is similar to a protracting instrument and comprises two angle-measuring arms or bars 11 and 13, together with a sector 12, with reference to whose straight edge or base-line the angular position of said arms may be adjusted. For convenience the arm 13 may be pivoted to the center of the sector, as at Y. The arm 11 and the sector 12 are pivotally connected on the straight-edge or base-line portion of the sector at a point eccentric to the pivot of arm 13.

The line joining the centers $x$ and $y$ coincides with the diameter or front edge of the sector 12, and the lines joining said centers with the point of intersection $z$ form a triangle, the elements of which in minature correspond to or are the plotted elements of the triangle whose base is the distance between the outlying station 15 and the range-finder station—say 16—and whose sides are the distances from said stations, respectively, to the target $n$. This is graphically delineated in Fig. 5. The parts 11 12 13 then serve to plot the triangle between the stations and the target, and by setting the arm 13 to form, with the front or straight edge of sector 12, the azimuth sent in by the observer at the outlying station and by also adjusting the angular position of said edge and arm 11 with relation to one another, so that they will make the same angle as that made between the line joining the instrument and target and the base-line running to the distant observing-station, the line $x\,z$ would represent the range of the target.

In the preferred construction of apparatus I mount the instrument so that it may be used as an automatic range-finding sight, and when the parts are all mounted together, so that they will all turn in azimuth in sighting the object, I employ in connection with the arm 11 and sector 12 a mechanism of such character that the geographical position of one part—as, for instance, the sector—may be maintained, while the other part—as, for instance, the arm—is being turned in azimuth, and by this means secure the required angular adjustment of said sector and arm with relation to one another. The devices for accomplishing this will be described later on.

For the purpose of adjusting the arm 13 any desired means may be employed, but I prefer to employ mechanism constantly connected to the arm 13 at its point of intersection with arm 11, for which purpose a pin 14, having a sliding connection with both the arm 11 and arm 13, may be employed, as at $z$. The base-piece 11 has a slot extending longitudinally thereof, wherein is located the rotary screw 17, the axis of which is preferably coincident with the line $x\ z$. Said slot forms a guide for a nut 18, which is propelled by said screw. By this nut is carried the pin 14, having a head engaged in an undercut groove in the under side of the arm 13.

When the sector 12 is so mounted that it would in the absence of other provision turn with the arm 11, it may be provided at its pivotal point of connection with said arm with the following devices: 20 is a worm-wheel secured to the sector or to the pivotal portion thereof, as shown. With this worm-wheel there meshes a worm, as 21, on a horizontal shaft 22, on whose outer end is another worm-wheel 23. The shaft 22 is journaled in bearings in the base-piece 11, and the worm-wheel 23 is incased in a suitable housing 24. With said wheel 23 meshes a worm 25, journaled in housing 24, to which worm rotation may be imparted by the shaft 26. The gearing just described for the rotation of sector 12 is that especially designed for automatically moving the sector at the time of directing the instrument on the target. Obviously any other means for rotating the sector may be employed.

The movement of the instrument to direct it upon the target may be effected in any suitable way, the exact direction being ascertained by means of a telescope, as 54, mounted upon the base-piece 11, with its axis preferably parallel to arm 11 and the axis of screw 17.

To effect the traversing of the instrument, it may be mounted upon a suitable pedestal, as 51—as, for instance, by extending into a vertical bearing in the pedestal a pivot-post, as 52, depending from the base-piece 11. A worm 53 is mounted upon the foot of said base-piece and connected for rotation to shaft 26 by means of bevel-gears 38 and 39 upon the shaft with worm 53 and shaft 26, respectively. The worm 53 meshes with a circular rack 48, fixed to the pedestal, and is rotated by a hand-wheel 40, thereby traversing the instrument and rotating the sector 12 thereof through the connection thereto, as above described. This gearing is so proportioned that as the instrument is traversed to direct it upon the target or object the sector is moved sufficiently to maintain its diameter coincident with the base-line, thereby establishing between the base-line of the sector and the arm an angle which represents or measures the angle made by the line to object or target with the base-line joining the observing-stations.

The rear portion of the base-piece has thereon a table 27, underlying the sector and furnishing a support therefor. The sector may be more closely held to the table, as by a flanged rib or block attached to the under side and located in an undercut channel, as indicated at 28, Figs. 1 and 2.

The arm 13 is pivoted at the center of the sector 12 on a suitable stud or bolt and is formed in two parts, (though it obviously may be in one.) One part thereof serves as the radius for sector 12 and has a window therein, through which the scale 29 of the sector may be read. Said scale is graduated in degrees in the usual way. On said arm is also preferably mounted a minute-scale, as at 30, which may be actuated from the toothed periphery of the sector 12, as indicated. The second part of the arm 13 extends from the under side of the sector over the groove in base-piece 11 and, as above stated, receives in a groove on its under side the head of pin 14. Any movement of the sector 12 or of the nut 18 will obviously change the point of intersection of the base-piece and the arm.

The nut 18 may be moved in any suitable way. For this purpose the rotary screw-shaft 17 is preferred, and this may be rotated by the milled head 31 or otherwise, as desired.

The distance of the center $z$ of the pin 14 from the pivotal center $x$ is the plotted range and may be indicated by a suitable scale on the base 11, as at 34, which is traversed by a pointer 36, carried by the pin 14.

Means for initially adjusting the relation of the base-piece 11 and the sector 12 are provided, Figs. 2 and 4, by forming a loose joint or friction-coupling in shaft 26. This may be done by making the worm 25 on a sleeve and seating the lower end 55 of the sleeve in a cylindrical socket 56. Within this sleeve is a bolt 57, having a split conical head located in the end 55 of the sleeve, which is also split. The upper end of the sleeve terminates in a knurl provided with retaining-lips, under which rests a flange on a nut 56 on the upper end of the bolt 57. By turning this nut the bolt's conical head is reciprocated in the split end of the sleeve and the same is tightened in the socket 56 or loosened therefrom, as desired. The base-piece and the sector are brought into proper accord initially or readjusted to suit changes in location of the termini of the base-line by traversing the base-piece until the axis of screw 17 coincides with the base-line, as may be determined by directing the telescope on the distant station. The front edge of the sector must then coincide with said line. If it does not, the parts 55 and 56 are loosened and the sector moved into line. This coincidence may be readily proven by rotating the screw 17 and running the nut 18 from end to end of its guide. When the sector and base-piece are in proper relation, they will remain unmoved while said nut is thus run along its screw. That this must be so may readily be seen by inspecting the diagram in Fig. 5, since then the centers $x$, $y$, and $z$ are in a straight line and the slot in arm 13 is in the same vertical plane as screw 17. When this adjustment has been effected, the parts 55 and 56 of the loose joint in shaft 26 are tightened and thereafter the sector will maintain the alinement of its front edge upon the distant station when the instrument is traversed.

In use the observer at the distant station 15 takes the azimuth of the target and signals the same to the instrument-station. The observer at the latter station immediately rotates the shaft 40, and by means of the telescope directs the instrument upon the target, and then by rotating the screw 17 he swings the arm 13 until the transmitted azimuth is shown at scales 29 and 30. The instrument is then properly laid upon the target, and the range may then be read from scale 34, said scale having been plotted by points and graduated by setting the instrument successively to certain known ranges.

In surveying by triangulation the instrument may be used upon a remote point whose distance is to be ascertained in substantially the same manner as just described for a target at sea. Thus, for instance, I do not limit myself to mounting the telescope upon any particular part of the instrument, it being only necessary that the act of turning the same in azimuth should establish between arm 11 and the base of the sector an angle the same as that made by the direction of the target or object with the direction of the distant observing-station, nor do I limit myself to the particular means described for adjusting the arm 13 to the transmitted azimuth, nor to the location of the range-reading scale upon any particular part.

What I claim as my invention is—

1. The combination, in a horizontal-base range-finder, of a base-piece having an arm or bar adapted to be traversed correspondingly with the changing azimuth position of a target, a sector having a base-line corresponding to the line of orientation, and intermediate mechanism operating on the sector to maintain the relation of its base-line to the line of orientation during the traverse of the base-piece, substantially as described.

2. In a horizontal-base range-finder, the combination of a sector having an azimuth-scale, a bar adapted to be swung according to the changing position of the target in azimuth and mounted or supported together with the sector so that when the bar is swung the base-line of the sector will tend to be moved with it, an angle-measuring arm pivoted on said sector and connected with the former bar by a pivotal and sliding connection, and mechanism for maintaining the position of the base-line of said sector and bar during the swinging of the support in azimuth substantially as described.

3. In a horizontal-base range-finder, the combination of a sector having an azimuth-scale, two angle-measuring bars pivotally connected to the base-line of said sector, means operating on the sector to maintain the relation of its base-line to the line of orientation during the traverse of the instrument, and an adjustable coupling in the operating mechanism adapted to permit readjustment in accordance with changes in location of the termini of the base-line with which the instrument is used, as and for the purpose described.

Signed at South Bethlehem, in the county of Northampton and State of Pennsylvania, this 9th day of October, A. D. 1901.

ISAAC N. LEWIS.

Witnesses:
J. F. MEIGS,
G. H. POWELL.